Oct. 16, 1951    M. T. GILDEN    2,571,704

OPHTHALMIC MOUNTING

Filed Sept. 17, 1948

*INVENTOR.*
MAURICE THEODORE GILDEN
BY
Louis L. Gagnon
ATTORNEY

Patented Oct. 16, 1951

2,571,704

UNITED STATES PATENT OFFICE 2,571,704

OPHTHALMIC MOUNTING

Maurice Theodore Gilden, Bronx, N. Y., assignor to American Optical Company, Southbridge, Mass., a voluntary association of Massachusetts Application September 17, 1948, Serial No. 49,817

3 Claims. (Cl. 88—41)

This invention relates to ophthalmic mountings and has particular reference to an improved mounting of the semi-rimless type.

One of the principal objects of the invention is to provide a lens supporting structure for the lenses of an ophthalmic mounting with which the lenses may be quickly and easily assembled and be resiliently held in position of use with substantially no strain on the lenses and with the parts retained in desired aligned relation with each other.

Another object is to provide a lens supporting structure of the above character which may be readily assembled with lenses of any desired edge thickness.

Another object is to provide a pair of lenses, each having side edge bearing portions formed to a standard dimension and with notches therein and a lens supporting structure for said lenses having inwardly channelled bearing members for engaging said side edge bearing portions and having projection means extending within said notches, said bearing members being resiliently supported in gripping engagement with the edge bearing portions of the lenses by resilient bar members shaped substantially to follow the upper contour shapes of the lenses and said supporting structure having bridge means connecting said bar members, temple supporting means on the temporal sides thereof and nose bearing means on the nasal sides thereof.

Another object is to provide a lens supporting structure for use with lenses having opposed bevelled side bearing edge portions and having notches extending inwardly of said bevelled edges with the said lens supporting structure comprising bar members of resilient material shaped substantially to follow the upper contour edges of the lenses and having bearing portions adjacent the nasal and temporal ends thereof formed with inwardly bevelled grooves for engaging the respective bevelled edges of the lenses and having means projecting inwardly of said bevelled grooves and adapted to extend within the notches in said bevelled edges of the lenses, the initial set of said resilient bar members being such as to initially support the bearing members at a distance apart less than the horizontal width of the lenses whereby the said bearing members must be spread apart against the resilient action of the bar members to permit the lenses to be seated in said bearing members and with the resiliency of said bar members constantly urging said bearing members against the bevelled edges of the lenses and simultaneously retaining the projection means inwardly of the opposed notches in said bevelled edges, said bearing means being adapted to provide a wide bearing surface with the bevelled edges of the lenses for removing strain on said lenses and with the interfitting of the projection means with the notches preventing movement of the lenses longitudinally of said inwardly bevelled bearing members.

Another object is to provide a lens supporting structure for the lenses of an ophthalmic mounting embodying U-clamp type resilient rim sections shaped substantially to follow the shape of the upper contour edges of the lenses and having bearing means adjacent the opposed ends thereof having relatively wide area contact with the opposed side edges of the lenses and adapted to be clampingly held in engagement with said lenses by said rim sections, said rim sections, while following substantially the upper contour shape of the lenses, being normally located in the rear of the lenses with said bearing means extending forwardly thereof and having adjustable screw-like projection means carried thereby and extending inwardly of the inner surfaces thereof and adapted to engage in opposed notches formed in the adjacent edges of the lenses, said resilient rim sections being free to be fixed in a direction inwardly of the peripheral edges of the lenses.

Other objects and advantages of the invention will become apparent from the following description taken in connection with the accompanying drawings and it will be apparent that many changes may be made in the details of construction and arrangements of parts without departing from the spirit of the invention as expressed in the accompanying claims. I, therefore, do not wish to be limited to the exact details of construction and arrangement of parts as the preferred forms only have been given by way of illustration.

Ophthalmic mountings of the so-called semi-rimless type, that is, having lens supporting structures with rim sections shaped substantially to follow the upper contour shapes of the lenses and adapted to clampingly hold the lenses in assembled relation therewith, are not new in the art.

Some attempts have been made to use resilient rim sections having forwardly projecting members adjacent the opposed ends thereof adapted to interfit in notches formed in the opposed edges of the lenses and to be clampingly held in assembled relation therewith by the resilient function of the rim sections. This type of mounting, however, directed all of the strain of the resilient gripping action of the forwardly projecting members with the lenses to the notches in the lenses with the result that the restricted area of said notches and said forwardly projecting members introduced great bearing strain and caused considerable breakage of lenses. With this type of mounting, the tilting strain on the lenses, due to the upper and lower edges of the lenses tending to tilt outwardly or inwardly with respect to the supporting structure, also was directed to the interfitting lugs and notches and further caused considerable breakage of lenses.

Other mountings of this nature in the prior art endeavored to provide shield-like members overlying the opposed side surfaces of the lenses at the location of the notches therein but here again the strain of the resilient gripping action of the lens supporting structure with the lenses was directed to interfitting lugs and notches. In the latter constructions of the prior art, no means was provided compensating for lenses of varying thicknesses and in most of the prior art structures of this nature, initial adjustments were required to fit the supporting structures with the lenses.

The present invention is directed to clamp-on type lens supporting structures. One of the main distinguishing features, however, of the present invention resides in the provision of bearing members secured to the opposed ends of resilient arms shaped to follow substantially the upper contour shape of the lenses and to lie rearwardly thereof. The said bearing members are provided with inwardly channelled surfaces extending longitudinally thereof with which edges of standard dimension formed on the opposed sides of the lenses are adapted to interfit, the said bearing members providing wide area substantially strain free contact and support the lenses against forwardly or rearwardly tilting movement relative to the supporting structure. In addition to the wide area strain free contact, the present construction further embodies projection members extending inwardly of the channels and adapted to interfit with notches formed in the opposed sides of the lenses. The projection members, however, are carefully controlled as to size and length so that when in assembled relation with the lenses, they do not have a pressure engagement with the notches in the lenses. The said projection members serve to lock and prevent the lenses from moving longitudinally of the bearing members when said bearing members are held in clamping engagement with the lenses by the resilient rim sections.

The function of the present device, therefore, is to clampingly hold the lenses inwardly of the channeled bearing members and to prevent displacement of the lenses vertically relative to the supporting structure through the interfitting relation of the projections and notches formed in the sides of the lenses. A construction of this nature firmly supports the lenses in assembled relation with the lens supporting structure with substantially no strain on the lenses and definitely avoids the difficulties of the prior art such as set forth above and, in addition thereto, permits lenses of any edge thickness to be readily assembled with the lens supporting structure with no requirement of initial adjustment of the lens engaging parts of the mounting.

Referring to the drawings.

Figure 1:
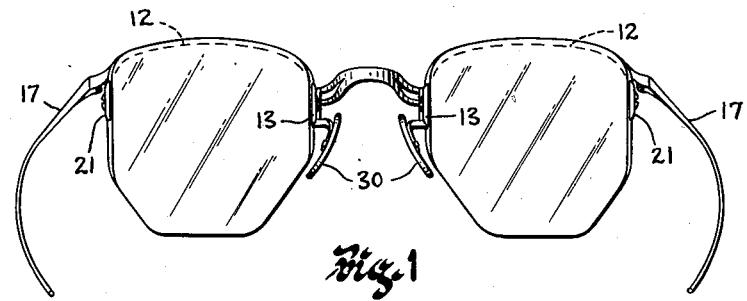
Fig. 1 is a front elevational view of a preferred mounting embodying the invention.

Referring more particularly to the drawings wherein like characters of reference designate like parts throughout the several views, the device, as shown in Figs. 1 through 5, embodies a pair of lenses 9 each having a bevelled edge portion 10 on the opposed sides thereof and having notches 11 formed in said bevelled edges intermediate the ends thereof.

Although the lenses 9, in this particular instance, are formed to a contour shape wherein the side edges of the lenses are substantially parallel with each other and embody only a length considerably less than the full height of the lens, it is to be understood that the lenses can be formed to any contour shape desired and that the bevels need only be formed throughout a length suitable for receiving the lens supporting structure of the mounting.

The lens supporting structure, in this instance, comprises a pair of resilient bar members or spring arms 12 shaped substantially to follow the upper contour shape of the lenses and to lie in the rear of the lenses whereby the ends of said bar members and the bar member throughout the length thereof is free to be flexed inwardly of the plane of the contour edge of the lens. The resilient bar members or spring arms 12, adjacent the opposed ends thereof, have a pair of bearing members 13 secured thereto each having an inner bevelled surface 14 extending throughout the length thereof shaped to receive the adjacent bevelled edges of the lenses.

Figure 4:
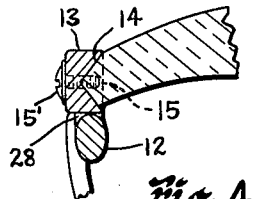
Fig. 4 is an enlarged fragmentary sectional view taken as on line 4—4 of Fig. 2 and looking in the direction indicated by the arrows and illustrating the relation of the bearing means with the edge of a lens of a plus power and having a relatively thin edge portion.
Figure 5:
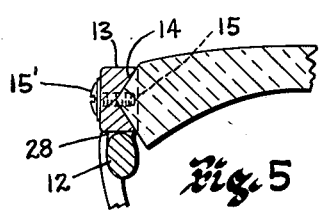
Fig. 5 is a view generally similar to Fig. 4 illustrating the bearing means in assembled relation with a lens of a minus power and having a relatively thick edge portion.

Each of the bearing members is provided with a projection 15 extending inwardly of the bevelled surface 14, as shown best in Figs. 4 and 5. The projection members, in this instance, are screw members having a threaded portion extending inwardly of a threaded opening formed in the respective bearing members 13 and having a slotted head 15' whereby the length of the projection portion 15 extending within the notches 11 in the lens can be adjusted. This arrangement also affords ease in assembling the structure as will be described more in detail hereinafter. Although the projections have been described as comprising screw members, it is to be understood that they may be pin-like members pressed inwardly of openings formed in the bearing members and of a controlled length which is such that the ends thereof will not engage with the base of the notches in the lenses when the supporting structure is in assembled relation with the lenses.

The bearing members 13 extend in a direction longitudinally of the bevelled edges of the lenses and, when in clamping engagement with the lenses, provide a relatively wide bearing surface with the edges of the lenses to firmly retain the lenses against forward or rearward tilting movement with respect to the lens supporting structure and simultaneously provide means for firmly clamping the lens through the action of the spring arms 12 with substantially no strain on the lenses.

It is particularly pointed out that the spring arms 12 have an initial set which spaces the bearing members 13 a distance apart considerably less than the horizontal width of the lens whereby the lens, when being assembled with the supporting structure, requires that the bearing members be resiliently spread apart to permit assembly whereupon releasing the spring arms and bearing members, the said spring arms will tend to return to their initial set and will firmly grip the edges of the lenses. The width of the notches 11 is carefully controlled according to the diameter of the projections 15 whereby the said projections will have a relatively snug fit with the respective side surfaces of the notches with the said width of the notches being so controlled as to avoid any wedging action to be introduced by the projection members, that is, the preferred construction is that the notches be slightly wider than the diameter of the projections so as to avoid strain when the parts are in assembled relation with each other. The said projection members 15 function cooperatively with the clamping action of the bearing members in holding the lenses in proper assembled relation with the lens supporting structure, that is, while the gripping action is solely introduced by the spring arms 12 and the bearing members 13, the projection means 15 fitting inwardly of the notches 11 tend to prevent any upward or downward movement of the lenses relative to said bearing means and thereby retain the parts in aligned relation with each other.

It is particularly pointed out that the lenses, in all instances, are provided with a bevel of a standard fixed angle and that the bevelled grooves 14 are of a standard fixed angle, as shown particularly in Figs. 4 and 5. Lenses of different thicknesses, therefore, may be readily assembled with the lens supporting structure without requiring any adjustment to compensate for different thicknesses of the edges of the lenses such as would be the case with plus and minus lenses, the plus lenses having a much thinner edge thickness as shown in Fig. 4 than the thickness of the edges of minus lenses as shown in Fig. 5.

Care is taken, however, in initially adjusting the spring arms and bearing members for resilient engagement and gripping function with the lenses to insure that the inner bevelled surfaces of the bearing members 13 and the bevelled bearing surfaces of the lenses have a substantially uniform and intimate fit with each other as it is this uniform contact which eliminates strain on the lenses and danger of breakage during use.

Figure 2:
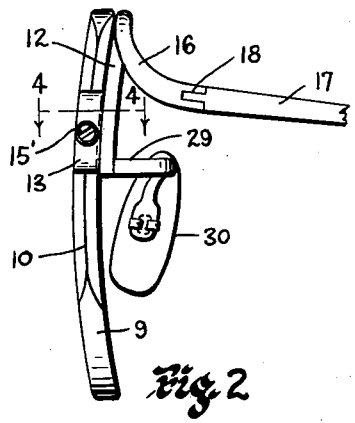
Fig. 2 is a side elevational view of the mounting illustrated in Fig. 1.

The resilient bar members or spring arms 12, as shown in Figs. 1 and 2, are provided on the temporal sides thereof withoutwardly and rearwardly curving temple supporting members 16 to which temples 17 are pivotally connected as at 18. It is particularly pointed out that the members 16 may be in the form of a separate member secured to the spring arm 12 as by soldering, welding or the like or may be formed as an integral part of the spring arm in which instance the depending ends of the members 12 on the temporal sides of the mounting and which carry the bearing members 13 may be formed separately and secured to the arms as by soldering, welding or the like.

Figure 6:
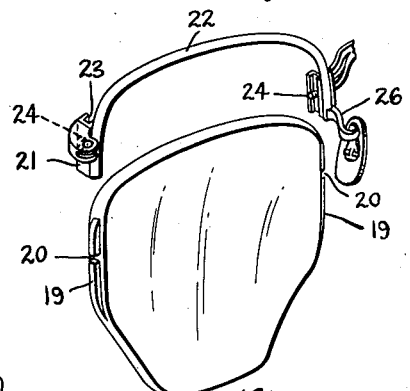
Fig. 6 is an exploded perspective view of a modified form of the invention.
Figure 7:
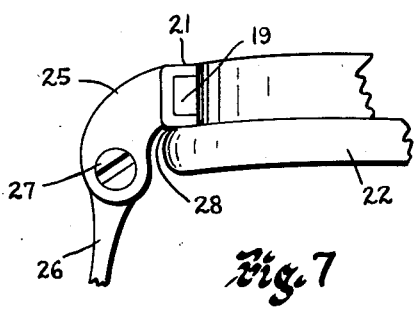
Fig. 7 is a fragmentary plan view of the temporal end portion of the mounting illustrated in Fig. 6.

In Figs. 6 and 7, there is illustrated a slightly modified form of the invention wherein instead of forming the opposed sides of the lenses with bevelled edge portions, the lenses are provided with projecting portions 19 extending in a direction longitudinally of the sides of the lenses with said portions 19 being formed to a given standard width throughout the length thereof and each having a notch 20 formed therein simulating the notch 11. In this instance, the bearing members 21 on the nasal and temporal sides of the spring arm 22 are provided with an inner longitudinally extending channel 23 shaped to receive the projection portion or rib 19 of standard width. The bearing members 21, like the members 13, are each provided with screw-like projection means 24 which are adapted to extend within the respective notches 20. The interfitting of the projections or ribs 19 with the longitudinal channels 23 in the bearing members 21 serve to support the lenses against tilting movement relative to the supporting structure of the mounting and, like the bevelled grooves in the bearing members 13, provide relatively wide area bearing surfaces between the lenses and said bearing members 21. The spring arm 22 functions in a manner similar to the spring arm 12 to constantly exert a clamping pressure of the bearing members on the side edges of the lenses and the projection means 24 interlocking with the notches 20 serve to prevent the lenses from sliding longitudinally relative to said bearing members. It is pointed out that instead of screw members 24, suitable pin-like or other projection means may be provided for engagement with the notches 20.

The spring arm 22, like the spring arm 12 is adapted to lie in the rear of the lens whereby it is free to be flexed in a direction inwardly of the peripheral edge of the lenses and it is free to constantly exert its spring clamping action of the bearing members 21 with the adjacent edges of the lenses.

In instances where screw means 14 or 24 are used, the screws are initially threaded outwardly an amount sufficient to permit the lenses to be slid in between the opposed bearing members 13 or 21 as the case may be. When the notches in the lenses are aligned with the screws, the said screw members may then be threaded inwardly an amount sufficient to prevent longitudinal movement of the lenses relative to said bearing members but in all instances, care is taken that the inner ends of the screws, as well as pins, when such means are used instead of screws, are spaced from the base of the notches and have no bearing pressure therewith responsive to the clamping action of the spring arms.

In the latter construction, as shown in Figs. 6 and 7, an endpiece member 25 is secured to the bearing member 21 on the outer side surface thereof and is adapted to have a temple 26 pivotally attached thereto as illustrated at 27.

In each instance the bearing members 13 or 21, as the case may be, are secured to the resilient bar-like members or spring arms 12 or 22 as by soldering or the like, as diagrammatically illustrated at 28 in Figs. 4, 5 and 7, that is, the spring arms are preferably secured to the rear side surface of the bearing members with said bearing members extending forwardly of said spring arms.

Figure 3:
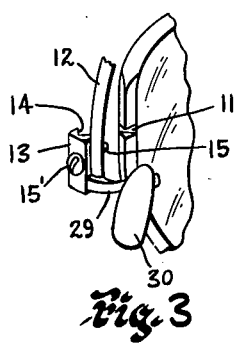
Fig. 3 is a fragmentary perspective view showing one edge portion of the lens and the associated bearing means in disassociated relation with each other.

In each construction, a guard arm 29, as illustrated in Figs. 2, 3 and 6, is secured either to the bearing member or end of the spring arm or both on the nasal sides thereof and is adapted to pivotally or rigidly support suitable nose bearing pads 30.

It is particularly pointed out that the resilient gripping action of the spring arms may be controlled by the proper initial adjustment of said arms, that is, by either initially forming the arms to different controlled diameters and by initially controlling the spaced relation of the ends of the arms in accordance with the lens to be assembled therewith. In each instance, however, the ends are located at an initial set position at a distance apart less than the distance between the side edges of the lenses so that when assembling the lens with the bearing members, it is always required to spread said bearing members apart with the spring arms resiliently responding to said spreading movement.

In instances when fixed pin-like projection means are employed, their length is initially controlled according to the depth of the notches so as to avoid engagement of the ends of said pins with the base of the notches when assembled with the lenses. The bearing members, when assembling the lenses with the supporting structure, are initially spread apart in amount sufficient to permit the lenses to be moved to accurate relation with the supporting structure whereby the pins, upon the releasing of outward strain on the bearing members and allowing them to respond to the resilient action of the spring arms will automatically cause the pins to seat in the notches and the bevelled or channelled surfaces of the bearing members to have a clamping bearing pressure with the sides of the lenses.

The above-described constructions permit the lenses to be quickly and easily assembled with the lens supporting structure and firmly hold the lenses in assembled relation with the supporting structure with substantially no strain on the lenses and with no danger of the lenses tilting relative to the lens supporting structure.

From the foregoing description, it will be seen that simple, efficient and economical means have been provided for accomplishing all of the objects and advantages of the invention.

Having described my invention, I claim:

1. An ophthalmic mounting comprising a pair of lenses, a centrally disposed bridge member and supporting arms of a resilient nature on opposed sides of the bridge to follow the upper nasal, top and upper temporal peripheral edge of said lenses and having means to which temples may be secured, said lenses having abutment portions disposed on the upper temporal and upper nasal peripheral edge thereof, said abutment portions projecting outwardly from the periphery of the opposed lens surfaces and having front and rear substantially flat surfaces disposed in a substantially vertical direction and in predetermined relation with each other, and clamp means carried by said resilient arms adjacent the ends thereof, said clamp means each embodying a member channelled along its length in a substantially vertical direction, and said channelled part thereof having substantially flat opposed walls disposed in a vertical direction and so related as to coincide with the front and rear surfaces of respective adjacent abutment portions when resiliently urged by said arms into bearing contact therewith, a movable pin-like member threadedly supported by the clamp means and having an end portion to extend into said channelled part thereof in a direction inwardly toward the adjacent lens surface periphery, said abutment portions having an intermediate part notched to receive said end portion thereof, and with the diameter of said end portion being less than the separation of the opposed sides of the notch to avoid pressure engagement therein.

2. An ophthalmic mounting comprising a pair of lenses, a centrally disposed bridge member and supporting arms of a resilient nature on opposed sides of the bridge to follow the upper nasal, top and upper temporal peripheral edge of said lenses and having means to which temples may be secured, said lenses having outwardly extending V-beveled edge portions disposed on the upper temporal and upper nasal peripheral contour thereof, the front and rear surfaces of said beveled portion being of substantially plane shape and disposed to extend in a substantially vertical direction, and clamp means carried by said resilient arms adjacent the ends thereof, said clamp means each embodying a member channelled throughout its entire length in a substantially vertical direction to a substantially V-shape and having open ends, with the opposed walls of said V-shaped channelled part being of substantially plane shape and so angled as to coincide with the front and rear surfaces of the respective adjacent beveled edge portion of the lenses when resiliently urged by said arms into bearing contact therewith, said clamp means having a projecting portion lying within its channelled part and extending in a direction inwardly of said lens and said beveled edge portion each having an intermediate part notched to receive said projecting portion, the base of said notches lying in a plane passing substantially through the point of intersection of one of the beveled edges with the adjacent side surface of the lens, the width of said projecting portion being less than the separation of the opposed sides of the notch and being of a length slightly less than the depth of said notch.

3. A lens supporting structure for use with the lenses of an ophthalmic mounting wherein the lenses have abutment portions on their temporal and nasal periphery with substantially plane opposed surfaces extending in an approximately vertical direction and notched intermediate the ends thereof, said lens supporting structure comprising a bridge having on its opposed sides a pair of resilient arms shaped to follow the top edge of said lenses and temple hinge means adjacent the outer ends of the resilient arms for connection with a pair of temples, said resilient arms each having adjacent the nasal and temporal sides thereof a substantially vertically disposed open-ended channelled member, said channelled members having opposed inner surfaces of substantially plane-shape and arranged vertically in predetermined relation to interfit with and resiliently grip, in substantially wide area contact therewith, the opposed surfaces of the respective abutment portions of a respective lens, and projection means carried by each of said channelled members to extend inwardly between the inner walls thereof and lie within the notched part of the respective abutment portions of the lens when assembled therewith, and with the projection means of at least one of said channelled members being movably mounted thereon, said movably mounted projection means being retractable from said position between the inner walls of its channelled member to permit the lens to be positioned with its abutment portions seated within the respective channelled members of each resilient arm while avoiding excessive distortion of the resilient arm in said assembly and said movable projection then being movable to its position inwardly of the notched portion of the adjacent abutment portion to maintain the lens assembled with said resilient arm.

MAURICE THEODORE GILDEN.

REFERENCES CITED

The following references are of record in the file of this patent:

UNITED STATES PATENTS

| Number | Name | Date |
| --- | --- | --- |
| 1,250,703 | Hamilton et al. | Dec. 18, 1917 |
| 2,151,668 | Vitolo | Mar. 21, 1939 |
| 2,277,118 | Leavitt | Mar. 24, 1942 |
| 2,352,729 | Metzer | July 4, 1944 |
| 2,362,725 | Slotsky | Nov. 14, 1944 |
| 2,373,862 | Vine | Apr. 17, 1945 |
| 2,383,572 | Splaine | Apr. 28, 1945 |
| 2,439,357 | Bouchard | Apr. 6, 1948 |

FOREIGN PATENTS

| Number | Country | Date |
| --- | --- | --- |
| 227,744 | Great Britain | Jan. 22, 1925 |
| 568,279 | Great Britain | Mar. 27, 1945 |